United States Patent [19]

Higham

[11] Patent Number: 4,819,439

[45] Date of Patent: Apr. 11, 1989

[54] LINEAR DRIVE MOTOR WITH IMPROVED DYNAMIC ABSORBER

[75] Inventor: Graham J. Higham, Ashland, Mass.

[73] Assignee: Helix Technology Corporation, Waltham, Mass.

[21] Appl. No.: 106,630

[22] Filed: Oct. 8, 1987

[51] Int. Cl.⁴ ............................................. F25B 9/00
[52] U.S. Cl. ................................... 62/6; 60/520; 310/12; 310/15
[58] Field of Search ................... 62/6; 60/520; 310/12, 310/15

[56] References Cited

U.S. PATENT DOCUMENTS

| | | | |
|---|---|---|---|
| 4,545,209 | 10/1985 | Young | 62/6 |
| 4,578,956 | 4/1986 | Young | 62/6 |
| 4,644,851 | 2/1987 | Young | 92/127 |
| 4,713,939 | 12/1987 | Keith | 60/520 |

Primary Examiner—Ronald C. Capossela
Attorney, Agent, or Firm—Hamilton, Brook, Smith & Reynolds

[57] ABSTRACT

A linear drive motor of cryogenic refrigerator in which a reciprocating armature alternately compresses and expands a gaseous fluid in a thermodynamic cycle. An isolator system comprising a countermass, having an antiphase movement with respect to the armature is centrally mounted on unitary springs. Isolator springs are mounted between the compressor and the compressor housing such that vibrations in to and out of the system are attenuated.

8 Claims, 2 Drawing Sheets

LINEAR DRIVE MOTOR WITH IMPROVED DYNAMIC ABSORBER

RELATED U.S. APPLICATIONS

"Linear Motor Compressor with Stationary Piston" filed on Oct. 8, 1987, by Graham Higham, Gerald Pruitt, Ronald Morris, Frank Heger, James Livingstone and David Tormey corresponding to U.S. Ser. No. 106,549; and "Linear Drive Motor with Flexure Bearing Support" filed on Oct. 8, 1987, by Graham Higham and corresponding to U.S. Ser. No. 106,428.

BACKGROUND OF THE INVENTION

This invention relates to cryogenic refrigerators such as split Stirling cryogenic refrigerators. In particular, it relates to small refrigeration systems having compressors driven by linear motors.

Conventional split Stirling refrigerators usually include a reciprocating compressor and a displacer in a cold finger removed from that compressor. The piston of the compressor is mechanically drive to provide a nearly sinusoidal pressure variation in the pressurized refrigeration gas. The refrigeration gas is usually helium. This pressure variation is transmitted through a supply line to the displacer in the cold finger.

Typically, an electric motor drives the compressor through a crankshaft which is rotatably secured to the compressor. The compressing movement of the compressor causes pressure in the working volume to rise from a minimum pressure to a maximum pressure and, thus a warm the working volume of gas. Heat from the warmed gas is transferred to the environment so that the compression at the warm end of the cold finger is near isothermal. The high pressure creates a pressure differential across the displacer in the cold finger which, when retarding forces are overcome, is free to move within the cold finger. With the movement of the displacer, high pressure working gas at about ambient pressure is forced through a regenerator and into a cold space. The regenerator absorbs heat from the flowing pressurized refrigerant gas and thus reduces the temperature of the gas.

As the compressor piston reverses direction and begins to expand the volume of gas in the working space, the high pressure helium in the displacer is cooled even further. It is this cooling in the cold end of the displacer which provides refrigeration for maintaining a time average temperature gradient of over 200 Kelvin over the length of the regenerator.

At some point the decrease in pressure caused by expanding movement of the piston drops sufficiently to overcome retarding forces on the displacer in the cold finger. This causes the displacer to be returned to its starting position. Cold gas from the cold end of the cold finger is driven once again through the regenerator and extracts heat therefrom.

Recently, refrigerators have been proposed and manufactured that depend on linear motors to control the movement of the piston or pistons in the compressor, and to control movement of the displacer. The systems use clearance seals between hard ceramic pistons and cylinder liners. An example is disclosed in U.S. Pat. No. 4,545,209, filed by Niels Young on Jan. 17, 1983. Isolation systems using dynamic absorbers have been used in conjunction with such linear drive systems. Such a system is described in the U.S. patent application Ser. No. 894,777 filed on Aug. 8, 1986 by Graham Higham, et al.

A goal of such linear refrigerators is long life and reduced wear as must be provided for advanced aircraft and spacecraft.

DISCLOSURE OF THE INVENTION

The invention comprises several improvements in linear drive motors used in compressors of cryogenic refrigerators. In particular, an isolation system adjacent the compressor to prevent the transmission of vibrations into and out of the system is claimed, wherein a countermass having an antiphase movement with respect to the compressor is centrally mounted on a unitary spring.

The unitary spring consists of first and second coil portions found in opposite ends of a cylinder. The countermass is mounted with an epoxy, for example, at the center of the cylinder such that countermass movement will compress the first coil portion while extending the second coil portion.

The unitary spring of a preferred embodiment of the invention is made by machining a hollow cylinder where the first coil portion spirals in one direction and the second coil portion spirals in the opposite direction. The unitary structure provides alignment of the two spring portions and eliminates wear surfaces.

A single countermass can be mounted on a plurality of unitary springs. A preferred embodiment of the invention utilizes four unitary springs to obtain better control over the spring constant of the countermass system. The shorter spring length of the small diameter coils enables such control.

The isolator system also utilizes coiled springs mounted between the compressor and the mounting frame. A preferred embodiment of the invention utilizes two such isolator springs positioned on opposite sides of a stator of the linear drive motor. The countermass assembly is axially positioned on one end of the compressor with one of the isolator springs sandwiched between the countermass assembly and the compressor. The more rigid portion of the compressor assembly along the stator is thus mounted directly with the isolator springs.

The above, and other features of the invention, including various novel details of construction and combination of parts, will now be more particularly described with reference to the accompanying drawings and pointed out in the claims. It will be understood that the particular embodiments of the invention are shown by way of illustration only and not as a limitation of the invention. The principle features of this invention may be employed in various embodiments without departing from the scope of the invention.

DETAILED DESCRIPTION OF THE INVENTION

Figure 1:
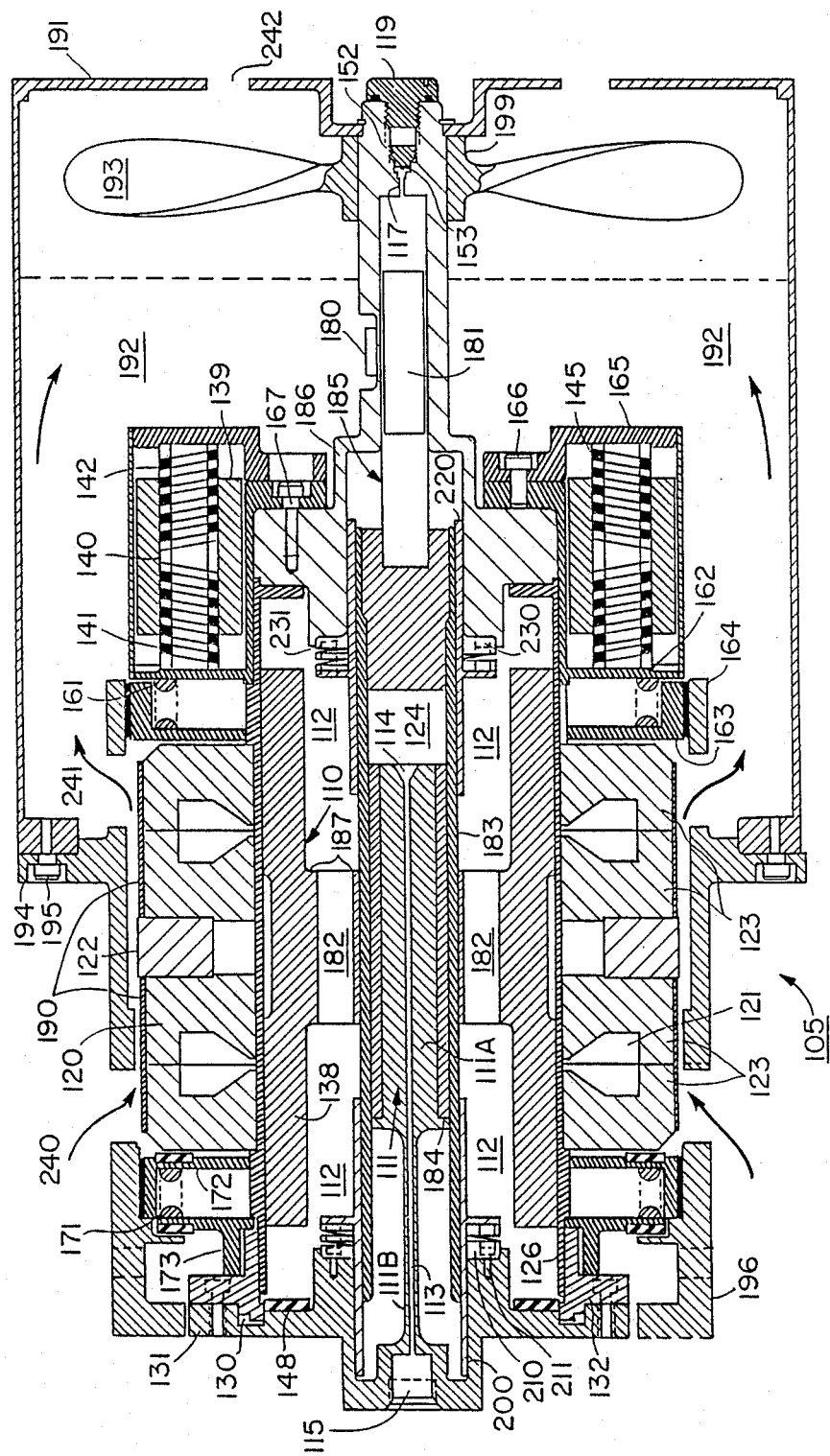
FIG. 1 is a cross-sectional view of a linear drive assembly of a helium cryogenic refrigerator of the present invention.

A linear drive assembly of a helium cryogenic refrigerator utilizing the improved dynamic absorber of the present invention is illustrated in FIG. 1. A linear motor is used to control the movement of an armature 110 in the compressor 105. The linear motor utilizes an involute laminated stator 120 first disclosed in U.S. Pat. No. 4,761,960, of G. Higham et al. filed July 14, 1986 entitled "Cryogenic Refrigeration System Having an Involute Laminated Stator for its Linear Drive Motor."

As shown in FIG. 1, this compressor 105 comprises a reciprocating armature 110 which compresses helium gas in a compression space 124. From the compression space 124 the gas passes through a port 114 in the stationary piston 111 to pre-formed bores through the piston 111 and plate 131 to form conduit 113. Conduit 113 runs along the core of stationary piston 111 to a gas fitting assembly 115. From the gas fitting assembly 115, gas is delivered to a cold finger of a cryogenic refrigerator such as a split Stirling refrigerator in which a displacer is housed as disclosed in U.S. Patent 4,545,209.

The armature housing extension 186 provides for a lead ball 153 and retainer screw 152 for sealing the port 117. The compressor is charged with helium gas through the port 117. The gas is allowed to communicate with an armature volume 112 of the piston cylinder through a small space between the flexure support sleeve 220 and the armature cylinder 183. During the compressor operation, however, the ball 153 is fixed against the housing portion 186 by the retainer screw 152 to close the port 117. A protective dust cover screw 119 is provided to prevent dirt and debris from entering the ball 153 and screw 152 seal.

The stationary piston 111 has a head portion 111A that pivots slightly about a flexible stem 111B. This flexible piston along with flexure support sleeves 200 and 220 permit the armature to be slightly skrewed with respect to the compressor axis. The stiffness in the flexible stem 111B and in the springs 210 and 230, on which the sleeves 200 and 220 respectively are mounted, tend to urge the armature into alignment. The flexible stem and flexure supports operates to reduce loads on the clearance seal generated by any skewing of the armature motion.

The armature 110 comprises an iron mass 138 fixed to a liner core 183. Iron is used because of its high magnetic permeability and high magnetic induction; however, other materials having the same characteristics may be used.

In order to detect the position of the armature a sensor 180 is used to detect a target magnet 181 fitted at one end of the armature 110. The magnet 181 is mounted on an extended cylinder 185 that oscillates within an extension 186 of the armature housing 126 during motor operation. By isolating the magnet 181 and sensor 180 way from the stator 120, the magnetic moment of magnet 180 is decoupled from the magnetic flux about piston 111.

Preferably, the armature 110 is fitted within a ceramic cylinder 183 to provide a clearance seal with the stationary piston 111. It is preferred that a bores 182 made through a neck !87 in the armature 110 permits the easy flow of gas about the reciprocating armature 110. A cermet liner 184 is mounted on the piston 111 to form part of the clearance seal.

Surrounding the armature 110 just described is a pressure housing 126. The size of the pressure housing is constructed to allow helium gas in the working volume 112 to flow freely between the pressure housing 126 and the iron mass 138 as the armature 110 shuttles back and forth.

A stator 120 is located around the perimeter of the pressure housing 126. The stator 120 comprises two coils 121 positioned between involute laminations 23 and separated by a magnet 22. This stator assembly is further described in U.S. Pat. No. 4,761,960 by G. Higham et al. recited above, which is incorporated herein. Two shields 190 have been concentrically disposed about the involuted laminations 123 to convey the magnetic flux lines along the inside wall 151 of the housing 150.

As a consequence of the armature 110 reciprocating back and forth, mechanical vibrations are produced by the compressor 105. To eliminate the vibrations, a passive vibration absorber or dynamic absorber 139 is attached to one end of the compressor and is tuned to resonate at the same frequency as the compressor's operating frequency. Preferably, the dynamic absorber 139 comprises a counterbalance mass 140 centrally mounted between two sections 141 and 142 of a single spring having small damping characteristics. As a result, the axial motion of the compressor is countered by the axial vibration from the counterbalance mass 140 of the absorber 139. A further description of dynamic absorber operation is found in U.S. Ser. No. 894,777 of G. Higham et al., filed Aug. 8, 1986, entitled "A Vibration Isolation System for a Linear Reciprocating Machine."

The present invention utilizes isolator springs 161 and 171 mounted on opposite ends of the compressor. The two springs 161 and 171 are coiled such that they are soft in the axial direction while being very stiff in the radial direction. One side of each spring is attached to the housing end plates 162 and 173 respectively. The other side of each spring is mount Ⓢd onto flanges 163 and 172 which are in turn attached to the outer housing elements 191 and 196, respectively. The springs can be mounted on elastomeric material located at both ends of compressor 105 providing a substantial level of damping to the isolator system. A preferred embodiment utilizes a damping ratio of at least 0.1, and preferably 0.2. Grease is applied to the wall 151 to help remove heat from the stator 120 while providing damping of internal vibrations of the compressor. A soft metallic gasket 130 is configured between the plate 131 and flange 132 to seal the armature volume 112 of the linear drive unit from the external atmosphere. Copending application entitled "Helium Pressure Seal for a Cryogenic Refrigerator" corresponding to U.S. Ser. No. 112,222, filed on Oct. 22, 1987, by Alan Weeks describes the nature and operation of this seal in greater detail.

Figure 2:
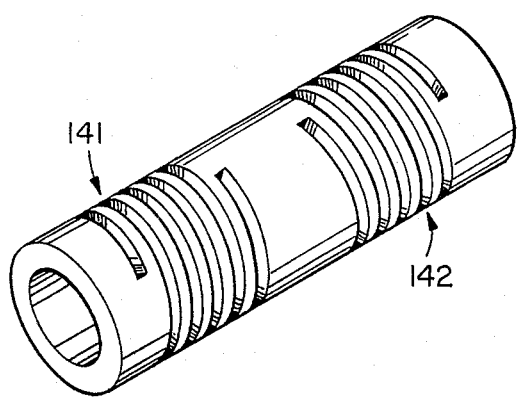
FIG. 2 illustrates a perspective view of the single spring mount for the countermass.

A perspective view of the unitary spring design is shown in FIG. 2. The separate coiled portions 141 and 142 are machined from a hollow cylinder. Each portion may be spiraled in a direction Opposite that of the other portion to insure even loading of both springs.

Figure 3:
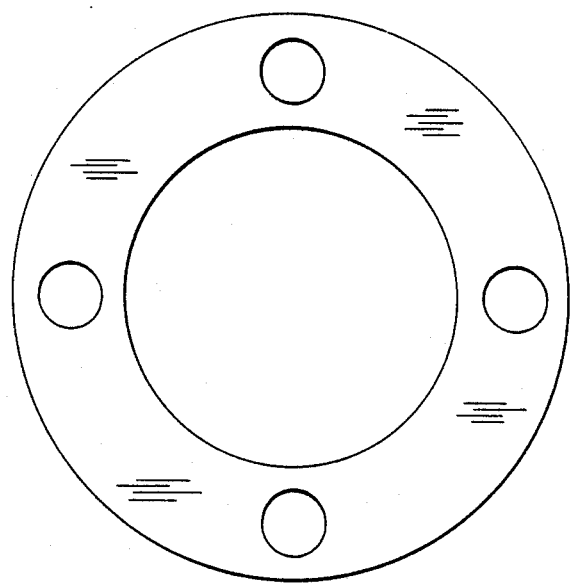
FIG. 3 illustrates an end view of the countermass with holes for mounting four unitary springs.

FIG. 3 shows an end view of the countermass in a preferred embodiment using four equidistant unitary spring mounts.

Cooling vents 240, 241, and 242 along the outer housing 191 permit air along the outer shields 190 of the drive assembly. This air flow removes heat from the motor. A fan 193 driven by motor 199 is used to propel air through the system.

I claim:

1. A cryogenic refrigerator having a compressor comprising a reciprocating armature which alternately compresses and expands a gaseous fluid in a working volume, a linear drive motor for driving the armature, and a vibration isolator system, the isolator system comprising:
- a mounting frame supporting the compressor;
- a counterbalance mass attached to the compressor such that an antiphase movement is produced relative to the reciprocating armature for substantially countering the resulting force exerted by the armature on the mounting frame; and
- a unitary spring on which the counterbalance is centrally mounted.

2. The cryogenic refrigerator of claim 1 wherein the compression of one end of the spring by the movement of the counterbalance coincides with the relative extension of the other end of the spring.

3. The cryogenic refrigerator of claim 1 wherein the unitary spring comprises a first coil disposed on one side of the central mount of the unitary spring and a second coil disposed on the opposite side of the central mount.

4. The cryogenic refrigerator of claim 3 wherein the first coil spirals in a direction opposite to that of the second coil.

5. The cryogenic refrigerator of claim 1 wherein the isolator system further comprises a plurality of unitary springs on which the counterbalance is centrally mounted.

6. The cryogenic refrigerator of claim 5 wherein the isolator system is comprised of four unitary springs.

7. A cryogenic refrigerator having a compressor comprising a reciprocating armature which alternately compresses and expands a gaseous fluid in a working volume, a linear drive motor for driving the armature, and a vibration isolator system, the isolator system comprising:
- a mounting frame supporting the compressor;
- a counterbalance mass attached to the compressor such that an antiphase movement is produced relative to the reciprocating armature for substantially countering the resulting force exerted by the armature on the mounting frames;
- an isolator comprising a first coiled spring concentric about one end of the armature and mounted between the mounting frame and the compressor,
- a second coiled spring concentric about the opposite end of the armature and mounted between the mounting frame and the compressor, and an elastomeric material mounted between the first coiled spring and the mounting frame to provide a substantial level of damping.

8. The cryogenic refrigerator of claim 7 wherein the counterbalance mass is axially mounted on an axis of the motor such that the first coiled spring is on one side of the motor and the second coiled spring is sandwiched between the opposite side of the motor and the counterbalance mass.

* * * * *